(12) United States Patent
Xu et al.

(10) Patent No.: US 12,365,774 B2
(45) Date of Patent: Jul. 22, 2025

(54) AQUEOUS SOFT TOUCH COATING COMPOSITION AND WEAR-RESISTING COATING FORMED BY SAME

(71) Applicant: PPG Coatings (Tianjin) Co., Ltd., Tianjin (CN)

(72) Inventors: Shengzhi Xu, Suzhou (CN); Haifeng Liu, Suzhou (CN); Siqi Gao, Suzhou (CN); Zhengsong Luo, Suzhou (CN)

(73) Assignee: PPG Coatings (Tianjin) Co., LTD., Tianjin (CN)

( * ) Notice: Subject to any disclaimer, the term of this patent is extended or adjusted under 35 U.S.C. 154(b) by 373 days.

(21) Appl. No.: 16/768,554

(22) PCT Filed: Nov. 30, 2018

(86) PCT No.: PCT/CN2018/118513
§ 371 (c)(1),
(2) Date: Jul. 6, 2023

(87) PCT Pub. No.: WO2019/105452
PCT Pub. Date: Jun. 6, 2019

(65) Prior Publication Data
US 2024/0181495 A1    Jun. 6, 2024

(30) Foreign Application Priority Data

Nov. 30, 2017 (CN) .......................... 201711242794.2
Nov. 28, 2018 (CN) .......................... 201811435036.7

(51) Int. Cl.
| C09D 133/04 | (2006.01) |
| B05D 7/00 | (2006.01) |
| C08J 7/043 | (2020.01) |
| C08J 7/046 | (2020.01) |

(52) U.S. Cl.
CPC .............. *C08J 7/043* (2020.01); *B05D 7/536* (2013.01); *C08J 7/046* (2020.01); *B05D 2400/00* (2013.01); *B05D 2401/21* (2013.01); *B05D 2420/01* (2013.01); *B05D 2420/02* (2013.01); *B05D 2502/005* (2013.01); *B05D 2503/00* (2013.01)

(58) Field of Classification Search
CPC .... B05D 3/0254; B05D 5/02; B05D 2401/20; C09D 133/04; C09D 169/00; C09D 175/04; C08L 55/02; C08L 69/00
See application file for complete search history.

(56) References Cited

U.S. PATENT DOCUMENTS

2013/0011592 A1    1/2013   Subramanian et al.
2017/0247568 A1*   8/2017   Song .................... C09D 167/07

FOREIGN PATENT DOCUMENTS

| CN | 103842446 A |   | 6/2014 | |
| CN | 104140724 A | * | 11/2014 | .............. B05D 7/02 |
| CN | 104403551 A |   | 3/2015 | |
| CN | 105143369 A |   | 12/2015 | |
| CN | 107892758 A |   | 4/2018 | |
| WO | 2012007431 A1 |   | 1/2020 | |

OTHER PUBLICATIONS

CN-104140724-A English translation. (Year: 2014).*

* cited by examiner

*Primary Examiner* — Hai Y Zhang
(74) *Attorney, Agent, or Firm* — Krisanne Shideler

(57) ABSTRACT

The present invention provides a multi-layer coating system comprising: (a) a first coating layer formed from a first coating composition; and (b) a second coating layer applied directly over at least a portion of the first coating layer and formed from a second coating composition. The present invention further provides a substrate coated with the multi-layer coating system.

13 Claims, No Drawings

AQUEOUS SOFT TOUCH COATING COMPOSITION AND WEAR-RESISTING COATING FORMED BY SAME

FIELD OF INVENTION

The present invention relates to multi-layer coating systems having low VOC, especially to multi-layer coating systems comprising a first coating layer and a second coating layer. The present invention further relates to substrates coated with the multi-layer coating systems.

BACKGROUND OF INVENTION

Currently, conventional commercially available soft-touch coatings for use in 3C products (including computer products, communication products, and consumer electronic products) are all oily products, which are all formulated with solvent-containing raw materials, and have a VOC content of up to 600-800 g/L, far exceeding the exemption point (420 g/L) of coating consumption tax in China. Thus, there is a need for water-borne soft-touch coating having low VOC in the art.

The present invention is intended to develop water-borne basecoats and water-borne elastic paints which have performances and hand feelings as oil paints, even more superior fingerprint-proof effect, and a VOC content of <200 g/L (much less than 420 g/L). Moreover, during the applying process of conventional oily coatings, solvent volatilizes into the environment, emits a strong irritating odor, and is easy to cause damage to the health of workers. Meanwhile, paints themselves are inflammable and explosive products, and thus the surrounding environment is required to have good fireproof performance. The water-borne coatings of the present invention cause less damage to workers, are completely non-combustion-supporting, and thus safer.

SUMMARY OF INVENTION

In one aspect, the invention provides multi-layer coating systems comprising:
(a) a first coating layer formed from a first coating composition comprising:
  (1) an acrylic resin, and
  (2) a hydroxyl functional acrylic resin, and
(b) a second coating layer applied directly over at least a portion of the first coating layer, the second coating layer being formed from a second coating composition comprising:
  (1) an aliphatic hydroxyl functional polyester polyurethane, and
  (2) a water dispersible polycarbonate diol resin.

In another aspect, the present invention provides coated substrates comprising:
(a) a substrate;
(b) a first coating layer applied over at least a portion of the substrate and formed from a first coating composition comprising:
(1) an acrylic resin, and
(2) a hydroxyl functional acrylic resin; and
(c) a second coating layer applied directly over at least a portion of the first coating layer, the second coating layer being formed from a second coating composition comprising:
(1) a polyester polyurethane resin, and
(2) a water dispersible polycarbonate diol resin.

In still another aspect, the present invention provides multi-layer coating systems comprising:
(a) a first coating layer formed from a first coating composition comprising:
(1) an acrylic resin, and
(2) a flexible polyurethane resin; and
(b) a second coating layer applied directly over at least a portion of the first coating layer, the second coating layer being formed from a second coating composition comprising:
(1) a polyester polyurethane resin, and
(2) a water dispersible polycarbonate diol resin.

In yet still another aspect, the present invention provides coated substrates comprising:
(a) a substrate;
(b) a first coating layer applied over at least a portion of the substrate and formed from a first coating composition comprising:
(1) an acrylic resin, and
(2) a flexible polyurethane resin; and
(c) a second coating layer applied directly over at least a portion of the first coating layer, the second coating layer being formed from a second coating composition comprising:
(1) a polyester polyurethane resin, and
(2) a water dispersible polycarbonate diol resin.

DETAILED DESCRIPTION

For the purposes of the following detailed description, it is to be understood that the invention may utilize various alternative changes and step orders, unless expressed clearly to the contrary. In addition, all numbers expressing quantities of ingredients used in the specification and claims are to be understood as being modified by the term "about" in all instances, unless in any examples or otherwise indicated. Accordingly, the numerical parameters set forth in the following description and the appended claims are approximations that vary depending on the desired properties to be obtained in accordance with the present invention, unless indicated to the contrary. At the very least, it is not intended to limit the application of the equivalents to the scope of the claims, and each of the numerical parameters should be interpreted at least in accordance with the number of significant figures reported and by applying ordinary rounding techniques.

Even if the numerical ranges and parameters set forth in the broad scope of the invention are approximations, the values listed in the examples are reported as precisely as possible. However, any numerical value inherently contains certain errors necessarily resulting from the standard deviations found in the measurement.

Moreover, it is to be understood that any numerical range recited herein is intended to include all sub-ranges contained therein. For example, the range of "1 to 10" is intended to include all sub-ranges between (and including) the minimum value 1 and the maximum value 10, that is, having a minimum value equal to or greater than 1 and a maximum value equal to or less than 10.

In the present application, the use of the singular terms includes its plural forms and the plural term includes its singular form, unless otherwise stated. Moreover, in the present application, unless otherwise stated, the term "or" is intended to mean "and/or", even if in some situation the term "and/or" is clearly used. In addition, in the present application, unless otherwise stated, the term "a" or "an" is intended to mean "at least one". For instance, "a polymer," "a coating composition", etc. refer to one or more of any of these items.

As used herein, the term "water-borne" refers to a coating composition including at least water in an amount of more than 50 wt %, based on the total solvent weight in the composition.

As used herein, the term "volatile organic compound (VOC)" refers to any organic compound having a boiling point less than or equal to 250° C. (482° F.) measured at a standard atmospheric pressure of 101.3 kPa. Organic solvents are a typical source for VOC.

As used herein, the term "emulsion" refers to a form of resins that can be emulsified in water only by addition of emulsifying agent(s). In terms of the present invention, the term "dispersion" refers to a form of resins that can be emulsified in water via self-emulsification without any additional emulsifying agent(s).

In an embodiment, the present invention provides coating systems comprising at least a first coating and a second coating. As described above, the first coating is formed from a first coating composition comprising an acrylic resin and a hydroxyl functional acrylic resin.

The acrylic resin used in the first coating composition has a high glass-transition temperature ($T_g$) and a high film-forming temperature. For instance, the acrylic resin has a glass-transition temperature of at least 80° C. For instance, the acrylic resin has a minimum film-forming temperature (MFFT) of at least 80° C. In particular, the acrylic resin may have a glass-transition temperature between 80 and 100° C. The glass transition temperature is determined by Dynamic Mechanical Analysis (DMA) using a TA Instruments Q800 apparatus with a frequency of 10 Hz, an amplitude of 5 mm, and a temperature ramp of −100° C. to 250° C., with the Tg identified as the peak of tan δ curve according to ASTM D7028.

As used herein, the term "minimum film forming temperature (also known as MFFT)" is the lowest temperature at which a polymer emulsion can form a continuous transparent film. The minimum film forming temperature of the emulsion is an important application parameter of the emulsion. That is, below a specific temperature, the polymer particles are still in a discrete state and cannot be integrated after the moisture of the emulsion is evaporated, so the emulsion cannot form a continuous and uniform coating film due to evaporation of water; above a specific temperature, after evaporation of water, molecules in each polymer particle will penetrate, diffuse, deform, and aggregate to form a continuous transparent film. The minimum film forming temperature of an emulsion can be used to determine the performance and application quality of the emulsion and latex coatings. The MFFT of the emulsion depends on the internal structure of the polymer particles and the glass transition temperature. The minimum film forming temperature can be determined according to ASTM D 2354 and ISO 2115 standards using an MFFT-BAR minimum film forming temperature meter (UK RHOPOINT Minimum Film Forming Temperature Tester MFFT-60 /MFFT-90).

Suitably, the acrylic resin comprises a styrene-modified acrylic resin having a number average molecular weight of about 100,000 to 120,000, as determined by gel permeation chromatography using polystyrene standard. Said styrene-modified acrylic resin can comprise acrylic resin containing styrene group, the content of which can be about 50-80 wt % based on the weight of the styrene-modified acrylic resin. The acrylic resin used in the first coating composition are generally present in a form of water-borne emulsion, and present as particles having a particle size ranging from 100 nm to 120 nm in the emulsion. Such particle size increases the stability of the emulsion and imparts a good appearance to the coating.

In general, the acrylic resin is present in the coating composition in an amount of at least about 10 wt %, suitably at least about 15 wt %, such as at least about 20 wt %, and up to about 50 wt %, suitably up to about 45 wt %, such as up to about 40 wt % based on the total weight the first coating composition. When the amount of the acrylic resin is less than 10 wt %, the first coating formed from the coating composition has low hardness, resulting in that it is hard to polish and easy to stick to sandpaper when repaired; and meanwhile, its poor adhesion to the substrate results in that the whole coating film is easy to peel. When the amount of the acrylic resin is higher than 60 wt %, the first coating formed from the coating composition has excessive hardness, resulting in that the interlayer adhesion between the first and the second coatings deteriorates and peeling occurs.

Various commercially available acrylic resins may be used in the present invention. For instance, examples of acrylic resins for use in the present invention may comprise, but are not limited to, Voncoat WHK-364 from DIC; Carboset CR-781, Carboset PC-23 from Lubrizol; Crysol® 6318 from Wanhua; NeoPac™ E-123, NeoCryl A-662 from DSM; AS2610, AC2508 from Alberdingk; or the like.

The hydroxyl functional acrylic resin of the first coating composition has generally a number average molecular weight of about 4,000 to 12,000, as determined by gel permeation chromatography using polystyrene standard. Suitably, the hydroxyl functional acrylic resin has a MFFT of about 20-60° C., which effectively ameliorates the film-forming property of the entire formula. Generally, the hydroxyl functional acrylic resins suitable for use in the present invention has a hydroxyl value of 30-110 mgKOH/g, which increases the cross-linking density with isocyanates curing agent, provides good flexibility, interlayer adhesion and chemical resistance.

In general, the hydroxyl functional acrylic resin is present in the coating composition in an amount of at least about 10 wt %, suitably at least about 15 wt %, such as at least about 20 wt %, and up to about 50 wt %, suitably up to about 45 wt %, such as up to about 40 wt % based on the total weight the first coating composition. When the amount of the resin is less than 10 wt %, the first coating film formed from the coating composition has relatively low cross-linking density, poor interlayer adhesion, poor chemical resistance, as well as poor hardness and RCA wear resistance. When the amount is greater than 50 wt %, the first coating formed from the coating composition has quite high cross-linking density, and the interlayer adhesion is poor as well.

Various commercially available hydroxyl functional acrylic resins may be used in the present invention. For instance, examples of hydroxyl functional acrylic resins for use in the present invention comprise, but are not limited to, UC84, AC2597, AC2598, AC2592, AC31 and AC3669 from Alberdingk; Bayhydrol A2845 XP and Bayhydrol U XP 2755 from Covestro; WD-551, WD-554, WD-555 and WD-556 from DIC; MACRYNAL® VSM 6299W/42WA, SM 6817W, Setaqua 6510, Setaqua 6516, Setaqua 6520 and Setaqua 6522 from Allnex; NeoCryl® XK-110, NeoCryl® XK-103 and NeoCryl® XK-102 from DSM; Antkote 2033 and Antkote 2042 from Wanhua; WPA-4402, WPA-4403 and WPA-4407 from Huigu Chemicals; Carboset 451 and Carboset 452 from Lubrizol; or the like.

The first coating composition may further comprise a thickener. It is preferred to use an alkali soluble anionic thickener, which is an acid-containing crosslinked acrylic emulsion copolymer. When such thickener is diluted with water and neutralized with alkali, the emulsion particles therein swell rapidly. The polyacrylic thickener may effectively improve the low shear rate viscosity, enabling the formed coating to have high shearing dilution characteristic, so as to ensure good workability and avoid fat edge. In general, the thickener is present in the coating composition in an amount of about 0.5-2wt % based on the total weight of the first coating composition.

Various commercially available thickeners may be used in the present invention. For instance, examples of thickeners for use in the present invention comprise, but are not limited to, Rheolate 150, Rheolate 175 from Element; Collacral® DS 6256, Viscalex® HV 30 from Basf; ACRYSOL™ ASE-60, TT-935, UCAR POLYPHONE T-900 and T-901 from Dow; or the like.

The first coating composition may further comprise a variety of adjuvants and co-solvents suitable for use in water-borne systems, comprising, but not limited to, surfactants, rheological adjuvants, ether- and amine-based co-solvents; or the like.

As described above, the second coating is directly applied over at least a portion of the first coating. The second coating is formed from a second coating composition comprising an aliphatic hydroxyl functional polyester polyurethane resin and a water dispersible polycarbonate diol resin.

The aliphatic hydroxyl functional polyester polyurethane resin of the second coating composition has an aliphatic group of a linear long-chain structure with about 15 to 25 carbon atoms. Suitably, the polyester groups and the polyurethane groups present in the aliphatic hydroxyl functional polyester polyurethane resin is in a ratio of 1:1-2. Suitably, the aliphatic hydroxyl functional polyester polyurethane resin has a number average molecular weight of about 8,000-10,000, as determined by gel permeation chromatography using polystyrene standard. In general, the aliphatic hydroxyl functional polyester polyurethane resin is in the form of a water-borne dispersion, and present as particles having a particle size ranging from 120 nm to 150 nm in the dispersion. Such particles sizes increase the stability of dispersion and impart good appearance to the coating. Moreover, the dispersion of the aliphatic hydroxyl functional polyester polyurethane resin can have about 40-60 wt %, such as 50 wt % solids. The dispersion of the aliphatic hydroxyl functional polyester polyurethane resin can be completely free of VOC.

In general, the aliphatic hydroxyl functional polyester polyurethane resin is present in the coating composition in an amount of at least about 10 wt %, suitably at least about 15 wt %, such as at least about 20 wt %, and up to about 40 wt %, suitably up to about 35 wt %, such as up to about 30 wt % based on the total weight of the second coating composition. When the amount of the resin is less than 10 wt %, the second coating formed from the coating composition exhibits too sticky hand feeling, poor smoothness, and poor fingerprint resistance. When the amount is greater than 40 wt %, the second coating formed from the coating composition has poor scratch resistance and poor hardness.

Various commercially available aliphatic hydroxyl functional polyester polyurethane resins may be used in the present invention. For instance, examples of the aliphatic hydroxyl functional polyester polyurethane resins for use in the present invention comprise, but are not limited to, Bayhydrol® U XP2757, Bayhydrol® U XP 2698, Bayhydrol U 355, Bayhydrol UH340/1 and DLC-F from Covestor; Matt 300 from Alberdingk; Sancure PC-55, 2060C from Lubrizol; NeoRez R-1000, NeoRez R-1010 from DSM; WSL-250 from DIC; PD-802, PD-804 from Stahl; W6110 from Mitsui; WPU-2501 and WPU-2502 from Huigu Chemicals; Crysol® 6512 and Crysol® 6110 from Wanhua; PU40, PU471, PU 980 and PU461 from Lamberti; or the like.

The water dispersible polycarbonate diol resin of the second coating composition comprises hydrophilic sulfonate groups, and can be directly dispersed in water. Suitably, the water dispersible polycarbonate diol resin has a number average molecular weight of 800-1,000 and a hydroxyl value of 90-110 mgKOH/g, wherein the number average molecular weight is determined by gel permeation chromatography using polystyrene standard. In general, the water dispersible polycarbonate diol is transparent 100% solids material, and completely free of VOC. When the resin is dispersed in water, the average particle size thereof is 100-130 nm. Such particle sizes increase the stability of dispersion and impart good appearance to the coating.

In general, the water dispersible polycarbonate diol resin is present in the coating composition in an amount of at least about 10 wt %, suitably at least about 15 wt %, such as at least about 20 wt %, and up to about 40 wt %, suitably up to about 35 wt %, such as up to about 30 wt % based on the total weight of the second coating composition. When the amount of the resin is less than 10 wt %, the second coating formed from the coating composition exhibits poor scratching resistance, poor wear resistance, poor chemical resistance, and poor hardness. When the amount is greater than 40 wt %, the second coating formed from the composition has sticky hand feeling, is difficult to matt or achieve the desired film thickness.

Various commercially available water dispersible polycarbonate diol resins may be used in the present invention. For instance, examples of the water dispersible polycarbonate diol resins for use in the present invention comprise, but are not limited to, 6665W from Changxing; PCDX-103 from AsahiKasei; PU 98D from Lamberti; HUX-516S and HUX-564 from Adaka; UW-3039E, UW-1077 和 UW-2001A from UBE; or the like.

The first coating composition and the second coating composition may further comprise an isocyanate group-containing component as the curing agent, which is reacted with the aliphatic hydroxyl functional polyester polyurethane and the hydroxyl functional acrylic resin to form coating films. The term "isocyanate group-containing component" and similar referents comprise isocyanate, polyisocyanate, and cyclic tripolymer of polyisocyanate.

Suitable isocyanates comprise isophoron diisocyanate, 1,3- or 1,4-cyclohexane diisocyanate, dicyclohexylmethane diisocyanate, tetraalkylxylylene diisocyanate (e.g., m-tetramethylxylylene diisocyanate, p-phenylene diisocyanate, polymethylene polyphenyl isocyanate, diphenylpentamethyl diisocyanate, 2,6-methyl-phenyl diisocyanate, dianisidine diisocyanate, ditolyl diisocyanate, naphthyl-1,4-diisocyanate, di(4-isocyanatophenyl)methane, 4,4'-diphenylpropane diisocyanate, hexamethylene diisocyanate, and a tripolymer of the foregoings if appropriate, e.g., an isocyanate tripolymer of hexamethylene diisocyanate.

In an aspect, the molar ratio of the isocyanate group in the isocyanate group-containing component to the hydroxyl group in the aliphatic hydroxyl functional polyester polyurethane resin ranges from 1.5-2:1. A molar ratio within the aforesaid ranges balances the comprehensive performance with the appearance.

In an aspect, the molar ratio of the isocyanate group in the isocyanate group-containing component to the hydroxyl group in the hydroxyl functional acrylic resin ranges from 1.3-2:1. A molar ratio within the aforesaid ranges meets the requirement of reaction rate and pot life of resins.

The second coating composition may further comprise a thickener. It is preferred to use a polyether polyurethane associated thickener. Such thickener is a viscosity adjuvant which is highly effective in the range of low to median shear rate, and can provide a strong shear dilution characteristic so as to balance the film building with fat edge. In general, the thickener is present in the coating composition in an amount of about 1-2 wt % based on the total weight of the second coating composition.

Various commercially available thickeners may be used in the present invention. For instance, examples of thickeners for use in the present invention comprise, but are not limited to, WT-105A, 299 from Element; Rheovis® PU 1191 from Basf; RM-12W from Dow; 3060 from Evonik; BORCHI GEL 0620 from Borchers; or the like.

The second coating composition may further comprise various adjuvants and co-solvents suitable for use in water-borne systems comprising, but not limited to, levelling agents, defoaming agents, surfactant, wetting and dispersing agents, matt agents, or the like.

In another embodiment, the present invention provides coating systems comprising at least a first coating and a second coating. As described above, the first coating is formed from a first coating composition comprising an acrylic resin and a flexible polyurethane resin.

The acrylic resin used in first the coating composition has a high film-forming temperature (glass-transition temperature, $T_g$). For instance, the acrylic resin has a minimum film-forming temperature of at least 80° C. In particular, the acrylic resin may have a $T_g$ between 80 to 100° C. Suitably, the acrylic resin comprises a styrene-modified acrylic resin having a number average molecular weight of about 100,000 to 120,000. The acrylic resin used in the first coating composition are generally present in a form of water-borne emulsion, and present as particles having a particle size ranging from 100 nm to 120 nm in the emulsion. Such particle size increases the stability of the emulsion and imparts a good appearance to the coating.

In general, the acrylic resin is present in the coating composition in an amount of at least about 10 wt %, suitably at least about 15 wt %, such as at least about 20 wt %, and up to about 60 wt %, suitably up to about 55 wt %, such as up to about 50 wt % based on the total weight of the first coating composition. When the amount of the acrylic resin is less than 10 wt %, the first coating layer formed from the coating composition has low hardness, resulting in that it is hard to polish and easy to stick to sandpaper when repaired; and meanwhile, its poor adhesion to the substrate results in that the whole coating film is easy to peel. When the amount of the acrylic resin is higher than 60 wt %, the first coating layer formed from the coating composition has excessive hardness, resulting in that the interlayer adhesion between the first and the second coatings deteriorates and peeling occurs.

Various commercially available acrylic resins may be used in the present invention. For instance, examples of acrylic resins for use in the present invention may comprise, but are not limited to, Voncoat WHK-364 from DIC; Carboset CR-781, Carboset PC-23 from Lubrizol; Crysol® 6318 from Wanhua; NeoPac™ E-123, NeoCryl A-662 from DSM; AS2610 and AC2508 from Alberdingk; or the like.

The flexible polyurethane resin of the first coating composition has generally a number average molecular weight of about 8,000 to 10,000. Such resins further have a very low MFFT ($T_g$). For instance, the flexible polyurethane resin has a MFFT of about −5 to 0° C., which effectively ameliorates the film-forming property of the entire formula. Moreover, such resin has generally a tension strength of 5,000-5,500 Psi, a tensile strength of 400-450 Psi, and an elongation of 900-950%. These characteristics facilitate the formation of an uniform and flat coating, and provide good flexibility, interlayer adhesion, and chemical resistance. The flexible polyurethane resin may comprise long-chain aliphatic polyurethane resins, polycarbonate-modified polyurethane resins or a combination thereof. The long-chain aliphatic group in the long-chain aliphatic polyurethane resins has generally a carbon chain length of about 15-25 carbon atoms, thereby imparting a flexible characteristic to the polyurethane resin. In particular, the flexible polyurethane resin may comprise a mixture of a long-chain aliphatic polyurethane resin and a polycarbonate-modified polyurethane resin at a weight ratio of about 60-80:20-40.

In general, the flexible polyurethane resin is present in the coating composition in an amount of at least about 10 wt %, suitably at least about 15 wt %, such as at least about 20 wt %, and up to about 40 wt %, suitably up to about 35 wt %, such as up to about 30 wt % based on the total weight the first coating composition. When the amount of the flexible polyurethane resin is less than 10 wt %, the first coating film formed from the coating composition is relatively hard, thereby causing poor adhesion to the upper coating film. When the amount is greater than 40 wt %, the first coating layer formed from the coating composition is too soft so that the surface of coating film is not resistant to scratching, seriously sticks to sandpaper when repaired, which significantly decreases the polishing efficiency.

Various commercially available polyurethane resins may be used in the present invention. For instance, examples of polyurethane resins for use in the present invention comprise, but are not limited to, Bayhydrol® UH 2952/1 from Covestro; PU 71, PU98 from Lamberti; WS-5100, WS-4300 from Mitsui; PU-461 from Stahl; or the like.

The first coating composition may further comprise a thickener. It is preferred to use an alkali soluble anionic thickener, which is an acid-containing crosslinked acrylic emulsion copolymer. When such thickener is diluted with water and neutralized with alkali, the emulsion particles therein swell rapidly. The polyacrylic thickener effectively improves the low shear rate viscosity, enabling the formed coating to have high shearing dilution characteristic, so as to ensure good workability and avoid fat edge. In general, the thickener is present in the coating composition in an amount of about 0.5-2wt % based on the total weight of the first coating composition.

Various commercially available thickeners may be used in the present invention. For instance, examples of thickeners for use in the present invention comprise, but are not limited to, Rheolate 150, Rheolate 175 from Element; Collacral® DS 6256, Viscalex® HV 30 from Basf; ACRYSOL™ ASE-60, TT-935, UCAR POLYPHONE T-900 and T-901 from Dow; or the like.

The first coating composition may further comprise a variety of adjuvants and co-solvents suitable for use in water-borne systems, comprising, but not limited to, surfactants, rheological adjuvants, ether- and amine-based co-solvents; or the like.

As described above, the second coating is directly applied over at least a portion of the first coating. The second coating layer is formed from a second coating composition comprising an aliphatic hydroxyl functional polyester polyurethane resin and a water dispersible polycarbonate diol resin.

The aliphatic hydroxyl functional polyester polyurethane of the second coating composition has an aliphatic group of a linear long-chain structure with about 15 to 25 carbon atoms. Such resins may have a number average molecular weight of about 8,000-10,000. The resin is generally a water-borne dispersion having 50% solids, completely free of VOC, and present as particles having a particle size ranging from 120 nm to 150 nm in the dispersion. Such particles size increases the stability of dispersion and imparts good appearance to the coating.

In general, the aliphatic hydroxyl functional polyester polyurethane resin is present in the coating composition in an amount of at least about 10 wt %, suitably at least about 15 wt %, such as at least about 20 wt %, and up to about 40 wt %, suitably up to about 35 wt %, such as up to about 30 wt %. based on the total weight of the second coating composition. When the amount of the resin is less than 10 wt %, the second coating formed from the coating composition exhibits too sticky hand feeling, poor smoothness, and poor fingerprint resistance. When the amount is greater than 40 wt %, the second coating formed from the coating composition has poor scratch resistance and poor hardness.

Various commercially available aliphatic hydroxyl functional polyester polyurethane resin may be used in the present invention. For instance, examples of the aliphatic hydroxyl functional polyester polyurethane resins for use in the present invention comprise, but are not limited to, Bayhydrol UH340/1 from Covestor; Sancure PC-55 from Lubrizol; NeoRez R-1000 from DSM; WPU-2501, etc. from Huigu Chemicals; Crysol® 6512 and Crysol® 6110 from Wanhua; PU40 and PU471 from Lamberti; or the like.

The water dispersible polycarbonate diol resin of the second coating composition comprises hydrophilic groups, and can be directly dispersed in water. The water dispersible polycarbonate diol is transparent 100% solids material, and completely free of VOC. The water dispersible polycarbonate diol has a number average molecular weight of 800-1,000 and a hydroxyl value of 90-110 mgKOH/g. When the resin is dispersed in water, the average particle size thereof is 100-130 nm. Such particle size increases the stability of dispersion and imparts good appearance to the coating.

In general, the water dispersible polycarbonate diol resin is present in the coating composition in an amount of at least about 10 wt %, suitably at least about 15 wt %, such as at least about 20 wt %, and up to about 40 wt %, suitably up to about 35 wt %, such as up to about 30 wt % based on the total weight of the second coating composition. When the amount of the resin is less than 10 wt %, the second coating layer formed from the coating composition exhibits poor scratching resistance, poor wear resistance, poor chemical resistance, and poor hardness. When the amount is greater than 40 wt %, the second coating formed from the composition has sticky hand feeling, is difficult to matt or achieve desired film thickness.

Various commercially available water dispersible polycarbonate diol resins may be used in the present invention. For instance, examples of the water dispersible polycarbonate diol resins for use in the present invention comprise, but are not limited to, 6665W from Changxing; PCDX-103 from AsahiKasei; PU 98D from Lamberti; or the like.

The second coating composition may further comprise an isocyanate group-containing component as the curing agent, which is reacted with the aliphatic hydroxyl functional polyester polyurethane to form a coating film. The term "isocyanate group-containing component" and similar referents comprise isocyanate, polyisocyanate, and cyclic tripolymer of polyisocyanate. Suitable isocyanates comprise isophoron diisocyanate, 1,3- or 1,4-cyclohexane diisocyanate, dicyclohexylmethane diisocyanate, tetraalkylxylylene diisocyanate (e.g., m-tetramethylxylylene diisocyanate, p-phenylene diisocyanate, polymethylene polyphenyl isocyanate, diphenylpentamethyl diisocyanate, 2,6-methylphenyl diisocyanate, dianisidine diisocyanate, ditolyl diisocyanate, naphthyl-1,4-diisocyanate, di(4-isocyanatophenyl) methane, 4,4'-diphenylpropane diisocyanate, hexamethylene diisocyanate, and a tripolymer of the foregoings if appropriate, e.g., a tripolymer of hexamethylene diisocyanate.

In an aspect, the molar ratio of the isocyanate group in the isocyanate group-containing component to the hydroxyl group in the aliphatic hydroxyl functional polyester polyurethane resin ranges from 1.5 to 2:1. A molar ratio within the aforesaid ranges can balance the comprehensive performance with the appearance.

The isocyanate group-containing component is present in the coating composition in an amount of about 15 to 20% based on the total weight of the second coating composition.

The second coating composition may further comprise a thickener. It is preferred to use a polyether polyurethane associated thickener. Such thickener is a viscosity adjuvant which is highly effective in the range of low to median shear rate, and can provide a strong shear dilution characteristic so as to balance the film building with fat edge. In general, the thickener is present in the coating composition in an amount of about 1-2wt % based on the total weight of the second coating composition.

Various commercially available thickener may be used in the present invention. For instance, examples of thickeners for use in the present invention comprise, but are not limited to, WT-105A, 299 from Element; Rheovis® PU 1191 from Basf; RM-12W from Dow; 3060 from Evonik; BORCHI GEL 0620 from Borchers; or the like.

The second coating composition may further comprise various adjuvants and co-solvents suitable for use in water-borne systems comprising, but not limited to, levelling agents, defoaming agents, surfactants, wetting and dispersing agents, matt agents, or the like.

The coating systems of the present invention may be applied to a variety of substrates in the coating industry. For instance, the coating systems may be applied to automobile substrates, industrial substrates, aircrafts and aircraft components, ship substrates and components, such as, naval ships, boats, and on-shore and off-shore facilities, storage tanks, windmills, nuclear power stations, package substrates, wood floors and furnishes, garments, electronic devices including housings and circuit boards, glass and transparent films, sports equipments, including golf, stadiums, buildings, bridges; or the like. The substrates may be, e.g., metallic or non-metallic. Metallic substrates comprise, but are not limited to, tin, steel (including electro-galvanized steel, cold rolled steel, hot-dipped galvanized steel, etc.), aluminum, aluminum alloys, zinc-aluminum alloys, steel coated with zinc-aluminum alloys, and aluminum-plated steel. Non-metallic substrates comprise polymers, plastics, polyesters, polyolefins, polyamides, celluloses, polystyrene, polyacrylics, polyethylene naphthalate, polypropylene, polyethylene, nylon, EVOH, polylactic acid, other "green" polymeric substrates, polyethylene terephthalate (PET), polycarbonates, polycarbonate acrylonitrile propylene-butadiene-styrene (PC/ABS), polyamides, wood, veneers, wooden complex materials, chipboards, median density fiberboards, cements, stones, glass, papers, paperboards, textiles, synthetic and natural leathers; or the like.

The substrates may further comprise metallized plastic substrates. As used herein, the "metallized plastic substrate" refers to a substrate formed from both plastic and metal. For instance, the metallized plastic substrates may comprise plastic materials comprising metallic materials incorporated therein and/or applied onto at least a portion of the plastic materials.

In particular, substrates comprise, but are not limited to, polycarbonate (PC), acrylonitrile-2-butadiene-2-styrene tripolymer (ABS)+polycarbonate, polycarbonate+glass fiber (GF) and carbon fiber (CF).

When at least partially applied onto consumer electronic products, the coating systems are particularly useful. For instance, the coating of the present invention may be used in substrates for use in notebook computers, tablet computers, keyboards, mobile telephones, other handheld electronic devices, etc. Based on the above, the present invention further comprises electronic products or electronic components at least partially coated with the coating of the present invention. It is to be understood that consumer electronic products may be prepared from any of the foregoing materials, such as, metallized plastics.

During the application of the coating systems, the first coating composition is applied onto at least a portion of a substrate, and thermally dried and cured at a temperature of 50-80° C. to form the first coating. Then, the second coating composition is applied onto at least a portion of the first coating, and thermally dried and cured at a temperature of 50-80° C. to form the second coating.

It is to be understood that the first coating may be applied as a primer onto the substrate, and the second coating may be applied as a topcoat onto the first coating. As used herein, the "primer" refers to a prime coating deposited onto the substrate to form a surface for coating a protective or decorative coating. Moreover, the "topcoat" refers to a top coating deposited onto another coating layer (such as, primer) to provide a protective and/or decorative layer.

The second coating may be applied as a transparent top coating. As used herein, the "transparent coating" refers to a coating which is substantially or completely transparent. The term "substantially transparent" means that when observed through a coating, the surface on the opposite side of the coating is at least partially visible to the naked eyes. The term "completely" means that when observed through a coating, the surface on the opposite side of the coating is completely visible to the naked eyes. It is to be understood that the transparent topcoat layer may comprise a colorant, such as, a pigment, as long as the colorant does not influence the desired transparency of the transparent topcoat layer. Alternatively, the transparent topcoat layer does not comprise any colorant, such as a pigment (i.e., uncolored).

The coating composition of the present invention may be applied by any standard method in the art, e.g., electro-coating, spraying, electrostatic spraying, dipping, roll coating, brush coating, or the like, and then cured to form a coating. The first coating of the present invention may be applied to achieve a dry film thickness of 5 microns to 15 microns. Moreover, the second coating of the present invention may be applied to achieve a dry film thickness of 20 microns to 60 microns.

EXAMPLES

The following examples are provided to further illustrate the present invention, but it is not understood that they limit the present invention to the details of the examples. Unless otherwise indicated, all the parts and percentages in the following examples and throughout the specification are based on weight.

Example 1. The 1 #Coating System According to the Present Invention

The 1 #primer coating composition is prepared from the components as listed in Table 1.

TABLE 1

| 1# Primer Composition | |
|---|---|
| Components | Weight Percent |
| Styrene-modified acrylic resin, Alberdingk AS2610 | 30 |
| Organic silicon defoaming agent, BYK-024 | 0.3 |
| Organic silicon levelling agent, BYK-348 | 0.3 |
| Texanol | 3 |
| Hydroxyl functional acrylic resin, WD-551 | 30 |
| dimethylethanolamine | 0.2 |
| Acrylic alkali-swelling thickener, ACRYSOLATE-60 | 1.5 |
| DI water | 24.7 |
| Aqueous pigment | 10 |
| Total | 100 |
| Curing agent, Covestro 2487/1 | 70 |
| Diluent | 30 |

The 1 #clear coating composition is prepared from the components as listed in Table 2.

TABLE 2

| 1# Clearcoat Composition | |
|---|---|
| Components | Weight Percent |
| Aliphatic hydroxyl functional polyester polyurethane, WPU-2502 | 30 |
| Water dispersible polycarbonate diol, 6665W | 30 |
| Organic silicon levelling agent, Tego 410 | 1.00 |
| Organic silicon defoaming agent, BYK 024 | 0.50 |
| Organic silicon levelling agent, BYK 348 | 0.40 |
| Organic silicon wetting and dispersing agent, Tego 752w | 0.50 |
| Modified matte powders, Tosho E-1011 | 7.00 |
| Polyurethane-associated thickener, Element 299 | 0.10 |
| DI water | 34.5 |
| Total | 100 |
| Curing agent, Covestro 2487/1 | 70 |
| Diluent | 30 |

Example 2. The 2 #Coating System According to the Present Invention

The 2 #primer coating composition is prepared from the components as listed in Table 3.

TABLE 3

| 2# Primer Composition | |
|---|---|
| Components | Weight Percent |
| Styrene-modified acrylic resin, PC-23 | 15 |
| Organic silicon defoaming agent, BYK-024 | 0.3 |
| Organic silicon levelling agent, BYK-348 | 0.3 |
| Texanol | 3 |
| Hydroxyl functional acrylic resin, WD-554 | 45 |
| dimethylethanolamine | 0.2 |
| Acrylic alkali-swelling thickener, ACRYSOLATE-60 | 1.5 |

TABLE 3-continued

2# Primer Composition

| Components | Weight Percent |
|---|---|
| DI water | 24.7 |
| Aqueous pigment | 10 |
| Total | 100 |
| Curing agent, Covestro 2487/1 | 70 |
| Diluent | 30 |

The 2 #clear coating composition is prepared from the components as listed in Table 4.

TABLE 4

2# Clearcoat Composition

| Components | Weight Percent |
|---|---|
| Aliphatic hydroxyl functional polyester polyurethane, Crysol ® 6512 | 25 |
| Water dispersible polycarbonate diol, PU 98D | 35 |
| Organic silicon levelling agent, Tego 410 | 1.00 |
| Organic silicon defoaming agent, BYK 024 | 0.50 |
| Organic silicon levelling agent, BYK 348 | 0.40 |
| Organic silicon wetting and dispersing agent, Tego 752w | 0.50 |
| Modified matte powders, Tosho E-1011 | 7.00 |
| Polyurethane-associated thickener, Element 299 | 0.10 |
| DI water | 30.5 |
| Total | 100 |
| Curing agent, Covestro 2487/1 | 70 |
| Diluent | 30 |

Example 3. The 3 #Coating System According to the Present Invention

The 3 #primer coating composition is prepared from the components as listed in Table 5.

TABLE 5

3# Primer Composition

| Components | Weight Percent |
|---|---|
| Styrene-modified acrylic resin, WHK-364 | 10 |
| Organic silicon defoaming agent, BYK-024 | 0.3 |
| Organic silicon levelling agent, BYK-348 | 0.3 |
| Texanol | 3 |
| Hydroxyl functional acrylic resin, WPA-4402 | 50 |
| dimethylethanolamine | 0.2 |
| Acrylic alkali-swelling thickener, ACRYSOLATE-60 | 1.5 |
| DI water | 24.7 |
| Aqueous pigment | 10 |
| Total | 100 |
| Curing agent, Covestro 2487/1 | 70 |
| Diluent | 30 |

The 3 #clear coating composition is prepared from the components as listed in Table 6.

TABLE 6

3# Clearcoat Composition

| Components | Weight Percent |
|---|---|
| Aliphatic hydroxyl functional polyester polyurethane, U2698 | 30 |

TABLE 6-continued

3# Clearcoat Composition

| Components | Weight Percent |
|---|---|
| Water dispersible polycarbonate diol, UW-1077 | 25 |
| Organic silicon levelling agent, Tego 410 | 1.00 |
| Organic silicon defoaming agent, BYK 024 | 0.50 |
| Organic silicon levelling agent, BYK 348 | 0.40 |
| Organic silicon wetting and dispersing agent, Tego 752w | 0.50 |
| Modified matte powders, Tosho E-1011 | 7.00 |
| Polyurethane-associated thickener, Element 299 | 0.10 |
| DI water | 35.5 |
| Total | 100 |
| Curing agent, Covestro 2487/1 | 70 |
| Diluent | 30 |

Example 4. The 4 #Coating System According to the Present Invention

The 4 #primer coating composition is prepared from the components as listed in Table 7.

TABLE 7

4# Primer Composition

| Components | Weight Percent |
|---|---|
| Styrene-modified acrylic resin, Alberdingk AS2610 | 30 |
| Organic silicon defoaming agent, BYK-024 | 0.3 |
| Organic silicon levelling agent, BYK-348 | 0.3 |
| Synthetic layered silicate, BYK RD | 0.2 |
| Diethylene glycol butyl ether | 5 |
| Ethylene glycol butyl ether | 5 |
| Flexible polyurethane, Lubrizol PC-55 | 20 |
| Dimethylethanolamine | 0.25 |
| Acrylic alkali-swelling thickener, ACRYSOLATE-60 | 1.5 |
| DI water | 37.45 |
| Total | 100 |
| Curing agent, Covestro 2487/1 | 70 |
| Diluent | 30 |

The 4 #clear coating composition is prepared from the components as listed in Table 8.

TABLE 8

4# Clearcoat Composition

| Components | Weight Percent |
|---|---|
| Aliphatic hydroxyl functional polyester polyurethane, WPU 2502 | 30 |
| Water dispersible polycarbonate diol, 6665W | 25 |
| Organic silicon levelling agent, Tego 410 | 1.00 |
| Organic silicon defoaming agent, BYK 024 | 0.50 |
| Organic silicon levelling agent, BYK 348 | 0.40 |
| Organic silicon wetting and dispersing agent, Tego 752w | 0.50 |
| Modified matte powders, Tosho E-1011 | 7.00 |
| Polyurethane-associated thickener, Element 299 | 1.5 |
| DI water | 34.1 |
| Total | 100 |
| Curing agent, Covestro 2487/1 | 70 |
| Diluent | 30 |

The components as listed in Tables 1-8, except the curing agent and the diluent, were weighed and stirred in a vessel for about 15 minutes, or stood at room temperature until the mixture was uniform. Prior to spraying, the curing agent and the diluent were added and stirred for 5 minutes to ensure that all the components were mixed uniformly. The coating mixture should be sprayed within 2 hours from the mixing of all the components.

Example 5: Application and Evaluation of Multi-Layer Coatings

A substrate (ABS+PC) was subject to pre-treatment including wiping and electrostatic dust collection. Then, the primer composition prepared in each of Examples 1-4 was sprayed manually or automatically (including by reciprocator, robot, and automatic assembly line) to form the first coating. The coating was baked at a temperature of 60-80° C. for about 20-30 minutes to form a coating having a dry film thickness of 5 to 15 microns. Then, the clear coat composition prepared in each of Examples 1-4 was sprayed manually or automatically (including by reciprocator, robot, and automatic assembly line) over the first coating to form the second coating. The formed coating was subject to flash-drying and levelling at room temperature for 3-10 minutes, and then baked at a temperature of 60-80° C. for 20-30 minutes to form a coating having a dry film thickness of 20-60 microns. Finally, the coated substrate was baked at a temperature of 60-80° C. for 6-8 hours to produce the test plate.

In accordance with various tests as listed in Table 9, the test plate was evaluated for various performance indexes. The results of tests are listed in Table 9. The performance indexes of two commercially available products, which are primarily used for automobile trim and common home appliances, are also shown in Table 9.

TABLE 9

Tests Results

| Test Item | Test Method | Specification | 1# Coating system of the present invention | 2# Coating system of the present invention | 3# Coating system of the present invention | 4# Coating system of the present invention | Commercial product 1 | Commercial product 2 |
|---|---|---|---|---|---|---|---|---|
| Adhesion | ASTM D3359 | >=4B | Pass, 4B | Pass, 4B | Pass, 4B | Pass, 4B | Pass, 4B | Pass, 4B |
| Pencil hardness | ASTM D3363 | >=F | Pass, H | Pass, F | Pass, 2H | Pass, F | Pass, F | Pass, F |
| Solvent resistance | MEK | 50 g, rating ≥4 after double wiping of 50 times | 50 g, rating ≥4 after double wiping of 50 times | Pass, rating 4 | Pass, rating 4 | Pass, rating 4 | Pass, rating 4 | Fail, swelling | Pass, rating 4 |
| RCA wear resistance/Tape wear resistance | ASTM F2357 | Test continues until the coating film wears out | 150 cycles | 150 cycles | 200 cycles | 100 cycles | 50 cycles | 70 cycles |
| Temperature and humidity test | N/A | No visible change, $\Delta E_{cmc} \leq 1.0$, adhesion pass | Pass, no visible change, adhesion rating 4B, $\Delta E_{cmc}$ = 0.20 | Pass, no visible change, adhesion rating 4B, $\Delta E_{cmc}$ = 0.20 | Pass, no visible change, adhesion rating 4B, $\Delta E_{cmc}$ = 0.20 | Pass, no visible change, adhesion rating 4B, $\Delta E_{cmc}$ = 0.20 | Pass, no visible change, adhesion rating 4B, $\Delta E_{cmc}$ = 0.40 | Pass, no visible change, adhesion rating 4B, $\Delta E_{cmc}$ = 0.22 |
| Fingerprint resistance | N/A | No visible stain after wiped thrice | Pass, no visible stain after wiped once | Pass, no visible stain after wiped once | Pass, no visible stain after wiped once | Pass, no visible stain after wiped once | Pass, no visible stain after wiped thrice | Fail, visible stain left after wiped thrice |
| Color stability | ASTM D4459 | $\Delta E_{cmc}$ is not greater than 1.0, no fracture, blister or deformation, and the outer surface is not sticky when touched | Pass, no change, $\Delta E_{cmc}$ = 0.30 | Pass, no change, $\Delta E_{cmc}$ = 0.20 | Pass, no change, $\Delta E_{cmc}$ = 0.16 | Pass, no change, $\Delta E_{cmc}$ = 0.19 | Fail, $\Delta E_{cmc}$ = 0.60 | Fail, $\Delta E_{cmc}$ = 2.60 |
| Resistance to soiling (oleic acid) | 40° C./ 95% RH/8 hours | $\Delta E_{cmc} \leq 1.0$, no visible fracture or crack, adhesion pass | Adhesion rating 4B, $\Delta E_{cmc}$ = 0.20, | Pass, no visible change, adhesion rating 4B, $\Delta E_{cmc}$ = 0.19 | Pass, no visible change, adhesion rating 4B, $\Delta E_{cmc}$ = 0.20 | Pass, no visible change, adhesion rating 4B, $\Delta E_{cmc}$ = 0.20 | Pass, no visible change, adhesion rating 4B, $\Delta E_{cmc}$ = 0.20 | Fail, swelling | Pass, no visible change, adhesion rating 4B, $\Delta E_{cmc}$ = 0.80 |

It can be seen from Table 9 as above that the coating systems 1 # to 4 # of the present invention are superior to or at least comparable with the commercial products in terms of all the tested performances. For instance, the coating systems of the present invention achieve pencil hardness of H even 2H, which is clearly superior to the pencil hardness of the commercial products (pencil hardness: 2H>H>F>HB>B). Thus, the coating systems of the present invention present excellent scratching resistance. Moreover, as to RCA wear resistance, the tests results of the coating systems of the present invention are at least 100 cycles, such as 150 cycles, even 200 cycles, that is comparable with or even better than the solvent-borne soft touch coating compositions in the art which are known to have good RCA wear resistance. Generally, in water-borne coating compositions, the improved performance in RCA wear resistance is compromised by poor hand feeling and workability. The coating systems of the present invention improve RCA wear resistance, and guarantee the hand feeling and workability characteristics at the same time.

Although certain aspects of the present invention have been explained and described, it is apparent to persons skilled in the art to make a variety of other variations and modification without departing the spirit and scope of the present invention. Thus, the accompanying claims are intended to encompass all of these variations and modifications falling within the scope of the present invention.

The invention claimed is:

1. A multi-layer coating system comprising:
    (a) a first coating layer formed from a first coating composition comprising:
        (1) an acrylic resin, and
        (2) a hydroxyl functional acrylic resin, and
    (b) a second coating layer applied directly over at least a portion of the first coating layer, the second coating layer being formed from a second coating composition comprising:
        (1) a aliphatic hydroxyl functional polyester polyurethane, and
        (2) a water dispersible polycarbonate diol resin.

2. The multi-layer coating system of claim 1, wherein the acrylic resin comprises a styrene modified acrylic resin having a number-average molecular weight of from about 100,000 to 120,000.

3. The multi-layer coating system of claim 1, wherein the hydroxyl functional acrylic resin has a hydroxyl value of from 30 to 110 mgKOH/g.

4. The multi-layer coating system of claim 1, wherein the hydroxyl functional acrylic resin has a number-average molecular weight of from about 4,000 to 12,000, a minimum film-forming temperature in the range of from 20° C. to 60° C.

5. The multi-layer coating system of claim 1, wherein the first coating composition further comprises an alkali soluble anionic thickener.

6. The multi-layer coating system of claim 5, wherein the alkali soluble anionic thickener comprises a polypropylene thickener.

7. The multi-layer coating system of claim 1, wherein the aliphatic hydroxyl functional polyester polyurethane has a number-average molecular weight of from 8,000 to 10,000, and the water dispersible polycarbonate diol resin has a number-average molecular weight of from 800 to 1,000.

8. The multi-layer coating system of claim 1, wherein the second coating composition further comprises a polyester polyurethane associative thickener.

9. The multi-layer coating system of claim 1, wherein the first and second coating compositions further comprise a component containing an isocyanate group.

10. The multi-layer coating system of claim 9, wherein the molar ratio of the isocyanate group in the component containing an isocyanate group to the hydroxyl group in the aliphatic hydroxyl functional polyester polyurethane is in a range of 1.5-2:1.

11. The multi-layer coating system of claim 9, wherein the molar ratio of the isocyanate group in the component containing an isocyanate group to the hydroxyl group in the hydroxyl functional acrylic resin is in a range of 1.3-2:1.

12. A coated substrate, comprising:
    (a) a substrate;
    (b) a first coating layer applied over at least a portion of the substrate, the first coating layer being formed from a first coating composition comprising:
        (1) an acrylic resin, and
        (2) a hydroxyl functional acrylic resin, and
    (c) a second coating layer applied directly over at least a portion of the first coating layer, the second coating layer being formed from a coating composition comprising:
        (1) an aliphatic hydroxyl functional polyester polyurethane, and
        (2) a water dispersible polycarbonate diol resin.

13. The coated substrate of claim 12, wherein the substrate comprises those formed by polycarbonate, acrylonitrile-2-butadiene-styrene ternary copolymer+polycarbonate, polycarbonate+glass fibre, and carbon fibre.

* * * * *